United States Patent
Doh et al.

(10) Patent No.: US 10,671,287 B2
(45) Date of Patent: Jun. 2, 2020

(54) METHOD OF PERFORMING GARBAGE COLLECTION, STORAGE DEVICE PERFORMING THE SAME AND COMPUTING SYSTEM INCLUDING THE SAME

(71) Applicant: Samsung Electronics Co., Ltd., Suwon-si, Gyeonggi-do (KR)

(72) Inventors: In-Hwan Doh, Seoul (KR); Byung-Hei Jun, Seoul (KR); Joo-Young Hwang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 9 days.

(21) Appl. No.: 16/110,088

(22) Filed: Aug. 23, 2018

(65) Prior Publication Data
US 2019/0146679 A1 May 16, 2019

(30) Foreign Application Priority Data
Nov. 16, 2017 (KR) .......................... 10-2017-0153405

(51) Int. Cl.
*G06F 3/06* (2006.01)

(52) U.S. Cl.
CPC .......... *G06F 3/0608* (2013.01); *G06F 3/0616* (2013.01); *G06F 3/0652* (2013.01); *G06F 3/0659* (2013.01); *G06F 3/0679* (2013.01)

(58) Field of Classification Search
CPC .... G06F 3/0616; G06F 3/0608; G06F 3/0679; G06F 3/0652; G06F 3/0659

USPC ................................................... 711/103, 165
See application file for complete search history.

(56) References Cited

U.S. PATENT DOCUMENTS

| | | | |
|---|---|---|---|
| 7,890,550 B2* | 2/2011 | Jung ................... | G06F 12/0246 707/813 |
| 8,255,373 B2 | 8/2012 | McKelvie et al. | |
| 8,521,948 B2 | 8/2013 | Post et al. | |
| 8,966,184 B2* | 2/2015 | Atkisson ............. | G06F 12/0804 711/133 |
| 9,466,383 B2 | 10/2016 | Peng et al. | |
| 9,519,429 B2 | 12/2016 | Grimsrud | |
| 9,665,482 B2 | 5/2017 | Hada | |
| 9,696,935 B2 | 7/2017 | Hashimoto et al. | |
| 9,971,681 B2* | 5/2018 | Zhang ................. | G06F 12/0246 |
| 2013/0173875 A1* | 7/2013 | Kim .................... | G06F 12/0246 711/160 |

(Continued)

FOREIGN PATENT DOCUMENTS

KR 10-2017-0063332 6/2017

*Primary Examiner* — Pierre Miche Bataille
(74) *Attorney, Agent, or Firm* — Harness, Dickey & Pierce, P.L.C.

(57) ABSTRACT

A method of operating a storage device to perform a garbage collection operation on a nonvolatile memory device having a plurality of memory blocks, the storage device configured to operate based on a multi-stream scheme such that a plurality of data is written into the plurality of memory blocks based on which of a plurality of streams is associated with the plurality of data. The method may include selecting at least two memory blocks among the plurality of memory blocks as victim memory blocks such that the victim memory blocks are configured to store data associated with a same stream of the plurality of streams; and performing the garbage collection operation on the victim memory blocks.

17 Claims, 14 Drawing Sheets

(56) References Cited

U.S. PATENT DOCUMENTS

| | | | |
|---|---|---|---|
| 2014/0006693 A1* | 1/2014 | Byun | G06F 12/0246 |
| | | | 711/103 |
| 2017/0075614 A1 | 3/2017 | Kanno | |
| 2017/0235486 A1 | 8/2017 | Martineau et al. | |
| 2017/0371781 A1* | 12/2017 | Choi | G06F 12/0253 |
| 2018/0276118 A1* | 9/2018 | Yanagida | G06F 3/064 |
| 2019/0018768 A1* | 1/2019 | Kim | G06F 12/0253 |

\* cited by examiner

METHOD OF PERFORMING GARBAGE COLLECTION, STORAGE DEVICE PERFORMING THE SAME AND COMPUTING SYSTEM INCLUDING THE SAME

CROSS-REFERENCE TO RELATED APPLICATION

This application claims priority under 35 USC § 119 to Korean Patent Application No. 10-2017-0153405, filed on Nov. 16, 2017 in the Korean Intellectual Property Office (KIPO), the contents of which are herein incorporated by reference in their entirety.

BACKGROUND

1. Technical Field

Example embodiments relate generally to storage devices. For example, at least some example embodiments relate to methods of performing garbage collection, storage devices performing the methods and computing systems including the storage devices.

2. Description of the Related Art

Certain types of data storage devices comprise one or more semiconductor memory devices. Examples of such data storage devices include solid state drives (SSDs). These types of data storage devices may enjoy various design and performance advantages over conventional hard disk drives (HDDs). Examples of potential advantages include the absence of moving mechanical parts, higher data access speeds, improved stability and durability, and low power consumption, to name but a few. These types of data storage device usually include nonvolatile memory devices, e.g., flash memories. In a flash memory of an SSD, an erase operation may be performed before a write operation. Further, in an SSD, write operations may be performed on a page (or sector) basis, while erase operations may be performed on a block basis, where a block includes a number of pages (or sectors). As data are continuously written to a flash memory, the data may become scattered over the entire flash memory. To obtain a free memory block, or a storage space to which data can be written, a garbage collection operation may be performed from time to time that moves an effective page of one memory block to another memory block and erases the one memory block.

SUMMARY

At least one example embodiment relates to a method of operating a storage device to perform a garbage collection operation on a nonvolatile memory device having a plurality of memory blocks, the storage device configured to operate based on a multi-stream scheme such that a plurality of data is written into the plurality of memory blocks based on which of a plurality of streams is associated with the plurality of data. In at least one example embodiment, the method includes selecting at least two memory blocks among the plurality of memory blocks as victim memory blocks such that the victim memory blocks are configured to store data associated with a same stream of the plurality of streams; and performing the garbage collection operation on the victim memory blocks.

At least one example embodiment relates to a storage device. In at least one example embodiment, the storage device includes a nonvolatile memory device including a plurality of memory blocks; and a storage controller configured to, control the nonvolatile memory device to operate based on a multi-stream scheme such that a plurality of data is written into the plurality of memory blocks based on which of a plurality of streams is associated with the plurality of data, select at least two memory blocks among the plurality of memory blocks as victim memory blocks such that the victim memory blocks are configured to store data associated with a same stream of the plurality of streams, and perform a garbage collection operation on the victim memory blocks.

According to example embodiments, a computing system includes a host configured to generate a write command and write data, the write command requesting a data write operation; and a storage device configured to receive the write command and the write data from the host, the storage device including, a nonvolatile memory device including a plurality of memory blocks configured to store the write data; and a storage controller configured to, operate based on a multi-stream scheme such that the write data is written into the plurality of memory blocks based on which of a plurality of streams is associated with the write data, select at least two memory blocks among the plurality of memory blocks as victim memory blocks such that the victim memory blocks are configured to store data associated with a same stream of the plurality of streams, and perform a garbage collection operation on the victim memory blocks.

In the method of performing the garbage collection and the storage device according to example embodiments, the garbage collection operation may be performed on the memory blocks that store the data with the same stream, with considering the streams (e.g., based on the plurality of streams). For example, the memory blocks that only store the data with the same stream may be selected as the victim memory blocks to perform the garbage collection operation. The memory block that stores data with another stream may not be selected as the victim memory blocks even though the number of valid pages is relatively small. Accordingly, after the garbage collection operation is performed, each memory block included in the storage device may only store the data with the same stream, the plurality of memory blocks may be continuously and consistently classified into and managed by the plurality of streams, and thus the storage device may have relatively more improved and enhanced performance and durability.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
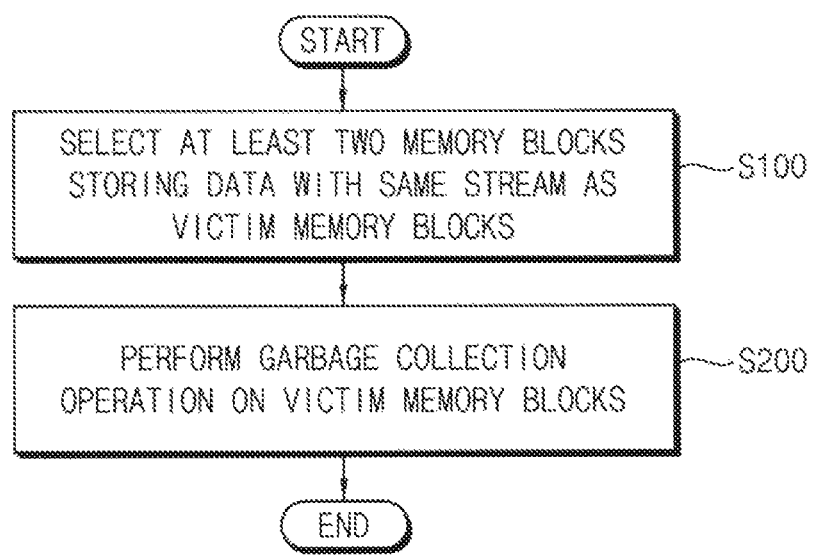
FIG. 1 is a flow chart illustrating a method of performing garbage collection according to example embodiments.

Various example embodiments will be described more fully with reference to the accompanying drawings, in which embodiments are shown. Example embodiments may, however, be embodied in many different forms and should not be construed as limited to the example embodiments set forth herein. Like reference numerals refer to like elements throughout this application.

FIG. 1 is a flow chart illustrating a method of performing garbage collection according to example embodiments.

Referring to FIG. 1, a method of performing garbage collection according to example embodiments may be executed by a storage device that includes a nonvolatile memory device including a plurality of memory blocks. The storage device may be configured to operate based on a multi-stream scheme in which a plurality of data written into the plurality of memory blocks are classified into and managed by a plurality of streams such that the storage device writes data associated with a same stream into a same single memory block. In other words, one memory block included in the storage device may only store data with the same stream.

In operation S100, the storage device selects at least two memory blocks among the plurality of memory blocks are selected as victim memory blocks. The at least two memory blocks selected as the victim memory blocks store data with the same stream.

In operation S200, the storage device may perform a garbage collection operation on the victim memory blocks. The garbage collection operation may represent an operation for obtaining or preparing a free memory block in the storage device. The victim memory block may represent a memory block that is an object or target of the garbage collection operation. The victim memory block may be referred to as a source memory block.

The storage device is configured to operate based on the multi-stream scheme, and perform the garbage collection operation on the at least two memory blocks that store the data with the same stream. The storage device may perform the garbage collection operation such that, after the garbage collection operation is performed, each memory block included in the storage device may only store the data with the same stream, and thus the plurality of memory blocks may be continuously and consistently classified into and managed by the plurality of streams.

Figure 2:
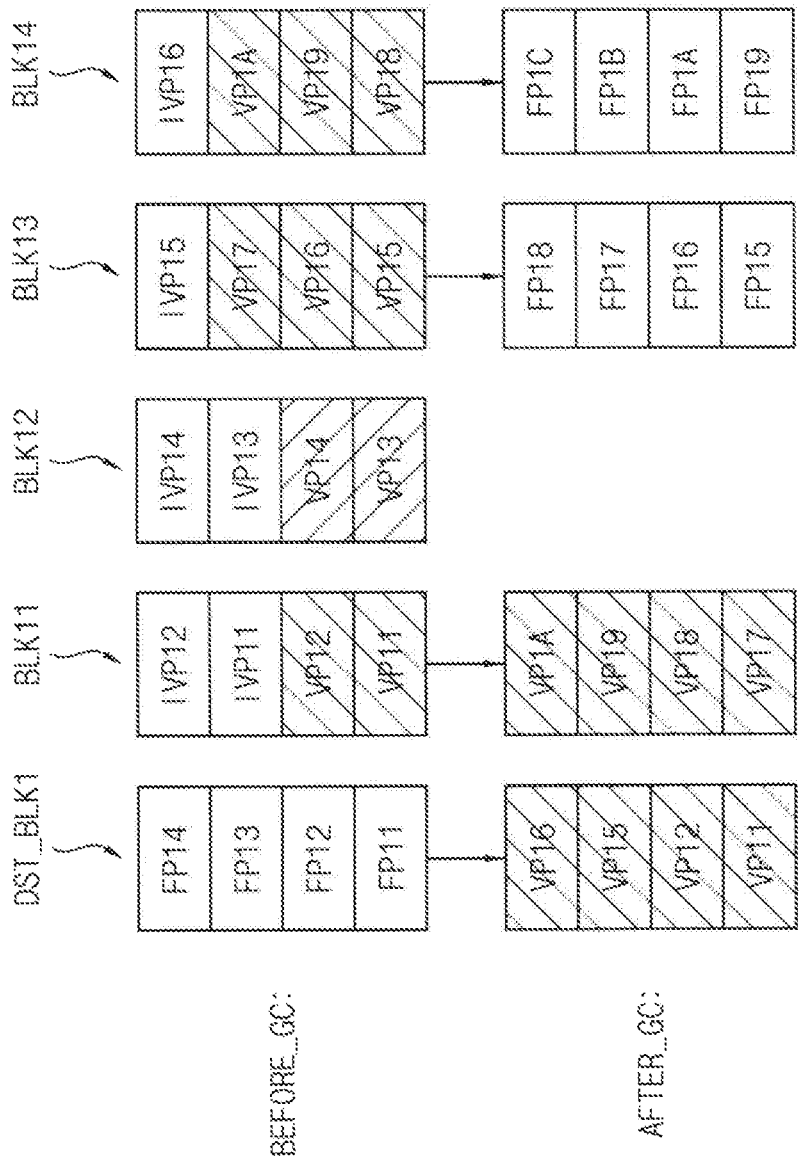
FIG. 2 is a diagram for describing an example of a method of performing garbage collection according to example embodiments.

FIG. 2 is a diagram for describing an example of a method of performing garbage collection according to example embodiments.

In FIG. 2 and following drawings, "BEFORE_GC" represents a state of data stored in a plurality of memory blocks before the garbage collection operation is performed, and "AFTER_GC" represents a state of data stored in the plurality of memory blocks after the garbage collection operation is performed.

Referring to FIGS. 1 and 2, the nonvolatile memory device included in the storage device may include a plurality of memory blocks DST_BLK1, BLK11, BLK12, BLK13 and BLK14. Each memory block may include a plurality of pages. For example, the plurality of memory blocks DST_BLK1, BLK11, BLK12, BLK13 and BLK14 may have the same size and may include the same number of pages. The plurality of pages may have the same size and may include the same number of nonvolatile memory cells. The nonvolatile memory device may perform a data write operation and a data read operation in units of page and may perform a data erase operation in units of memory block.

Before the garbage collection operation is performed, the memory block DST_BLK1 may include free pages FP11, FP12, FP13 and FP14, the memory block BLK11 may include valid pages VP11 and VP12 and invalid pages IVP11 and IVP12, the memory block BLK12 may include valid pages VP13 and VP14 and invalid pages IVP13 and IVP14, the memory block BLK13 may include valid pages VP15, VP16 and VP17 and an invalid page IVP15, and the memory block BLK14 may include valid pages VP18, VP19 and VP1A and an invalid page IVP16. In other words, the memory block DST_BLK1 may be a free memory block, and each of the memory blocks BLK11, BLK12, BLK13 and BLK14 may be a used block in which data are already stored or written.

In addition, based on the multi-stream scheme, each memory block may store data with the same stream. For example, the valid pages VP11, VP12, VP15, VP16, VP17, VP18, VP19 and VP1A included in the memory blocks BLK11, BLK13 and BLK14 may store data with a first stream, and the valid pages VP13 and VP14 included in the memory block BLK12 may store data with a second stream that is different from the first stream. In FIG. 2, the valid pages VP11, VP12, VP15, VP16, VP17, VP18, VP19 and VP1A storing the data with the first stream and the valid pages VP13 and VP14 storing the data with the second stream are distinguished from each other by different types of hatched line.

In some example embodiments, the plurality of streams may be divided, classified or categorized based on a frequency of accessing or updating data (e.g., the number of times data is accessed or updated). For example, the data with the first stream may be hot data or dynamic data that is relatively frequently and/or repeatedly accessed or updated, and the data with the second stream may be cold data or static data that is relatively infrequently and/or rarely accessed or updated. In other example embodiments, the plurality of streams may be divided, classified or categorized based on at least one of various criteria or standards.

When the garbage collection operation is to be performed, as discussed above, in operation S100, the storage device may select memory blocks storing the data with the same stream as the victim memory blocks. For example, the memory blocks BLK11 and BLK12 storing the data with different streams may not be selected as the victim memory blocks, and the memory blocks BLK11, BLK13 and BLK14 storing the data with the same stream (e.g., the first stream) may be selected as the victim memory blocks.

Further, as discussed above, in operation S200, the storage device may perform the garbage collection operation on the memory blocks BLK11, BLK13 and BLK14 that are selected as the victim memory blocks. For example, the memory block DST_BLK1 may be used as a destination memory block for the garbage collection operation.

For example, the valid pages VP11 and VP12 included in the memory block BLK11 may be copied into the memory block DST_BLK1, and the data erase operation may be performed on the memory block BLK11 to change the memory block BLK11 to a free memory block. Similar operations may be performed on the memory blocks BLK13 and BLK14, and then the memory block BLK11 may be used as an additional destination memory block. For example, the valid pages VP15 and VP16 included in the memory block BLK13 may be copied into the memory block DST_BLK1, the valid page VP17 included in the memory block BLK13 may be copied into the memory block BLK11, and the valid pages VP18, VP19 and VP1A included in the memory block BLK14 may be copied into the memory block BLK11. The data erase operation may be performed on the memory blocks BLK13 and BLK14 to change each of the memory blocks BLK13 and BLK14 to a free memory block.

As a result, after the garbage collection operation is performed, the memory block DST_BLK1 may include the valid pages VP11, VP12, VP15 and VP16, the memory block BLK11 may include the valid pages VP17, VP18, VP19 and VP1A, the memory block BLK13 may include free pages FP15, FP16, FP17 and FP18, and the memory block BLK14 may include free pages FP19, FP1A, FP1B and FP1C. Although not illustrated in FIG. 2, a state of data stored in the memory block BLK12 after the garbage collection operation may be substantially the same as the state of data stored in the memory block BLK12 before the garbage collection operation. In comparison with before the garbage collection operation, one more free memory block may be added after the garbage collection operation.

In addition, as with before the garbage collection operation, each memory block may store the data with the same stream after the garbage collection operation. For example, the valid pages VP11, VP12, VP15, VP16, VP17, VP18, VP19 and VP1A included in the memory blocks DST_BLK1 and BLK11 may store the data with the first stream.

Generally, specific types of data may tend to have similar data lifetimes or lifecycles, and may tend to be invalidated at similar time points. When the multi-stream scheme is employed, data that have the similar data lifetimes or lifecycles and are invalidated at the similar time points may be set to have the same stream, may be stored into the same memory block in physical, may be validated during similar or the same time interval, and may be invalidated at once, thereby improving and enhancing performance and durability of the storage device. The multi-stream scheme may be referred to as a stream directives scheme, and was standardized.

In a conventional storage device that operates based on the multi-stream scheme, a garbage collection operation may not be performed in consideration of streams, and thus there may be a problem that data with different streams are stored and mixed in the same memory block the conventional storage device performs the garbage collection operation. For example, the conventional storage device may perform the garbage collection operation based on a greedy algorithm in which memory blocks having the smallest number of valid pages are selected as victim memory blocks. For example, in an example of FIG. 2, the conventional storage device may select the memory blocks BLK11 and BLK12 having the smallest number of valid pages as the victim memory blocks, without considering the streams, to perform the garbage collection operation. After the garbage collection operation is performed on the memory blocks BLK11 and BLK12, the data with different streams (e.g., the first and second streams) may be stored in one memory block (e.g., the memory block DST_BLK1).

In contrast, in one or more example embodiments, the storage device may perform the garbage collection operation in consideration of the streams (e.g., based on the plurality of streams) such that the memory blocks that store the data with the same stream are selected as the victim blocks even if these blocks do not have the smallest number of valid pages.

For example, as illustrated in FIG. 2, the memory blocks BLK11, BLK13 and BLK14 only storing the data with the first stream may be selected as the victim memory blocks to perform the garbage collection operation. The memory block BLK12 storing the data with the second stream that is different from the first stream may not be selected as the victim memory blocks even though the number of valid pages in the memory block BLK12 is relatively small. Accordingly, after the garbage collection operation is performed, each memory block included in the storage device may only store the data with the same stream, the plurality of memory blocks may be continuously and consistently classified into and managed by the plurality of streams, and thus the storage device may have relatively more improved and enhanced performance and durability.

Figure 3:
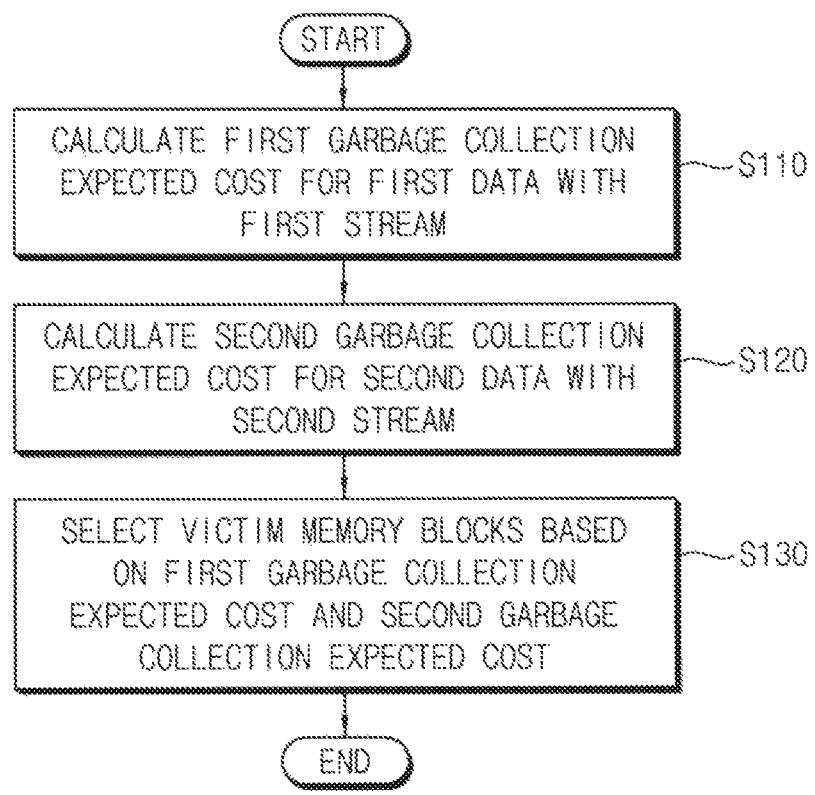
FIG. 3 is a flow chart illustrating an example of selecting victim memory blocks in the method of FIG. 1.

FIG. 3 is a flow chart illustrating an example of selecting victim memory blocks in the method of FIG. 1.

Referring to FIGS. 1 and 3, as discussed above, in operation S100, the storage device may select memory blocks storing the data with the same stream as the victim memory blocks. In selecting the at least two memory blocks storing the data with the same stream as the victim memory blocks, the storage device may calculate garbage collection expected costs, and select the victim memory blocks based on the garbage collection expected costs.

For example, in operation S110, the storage device may calculate a first garbage collection expected cost for a first stream and for first data with the first stream that are stored in first memory blocks.

In operation S120, the storage device may calculate a second garbage collection expected cost for a second stream and for second data with the second stream that are stored in second memory blocks. The second stream may be different from the first stream.

In operation S130, the storage device may select one of the first memory blocks and the second memory blocks as the victim memory blocks based on the first garbage collection expected cost and the second garbage collection expected cost.

In some example embodiments, when the first garbage collection expected cost is less than the second garbage collection expected cost, the storage device may select the first memory blocks as the victim memory blocks. In contrast, when the second garbage collection expected cost is less than the first garbage collection expected cost, the storage device may select the second memory blocks as the victim memory blocks. In other words, the storage device may select memory blocks that correspond to a stream having a relatively low garbage collection expected cost as the victim memory blocks.

Figure 4:
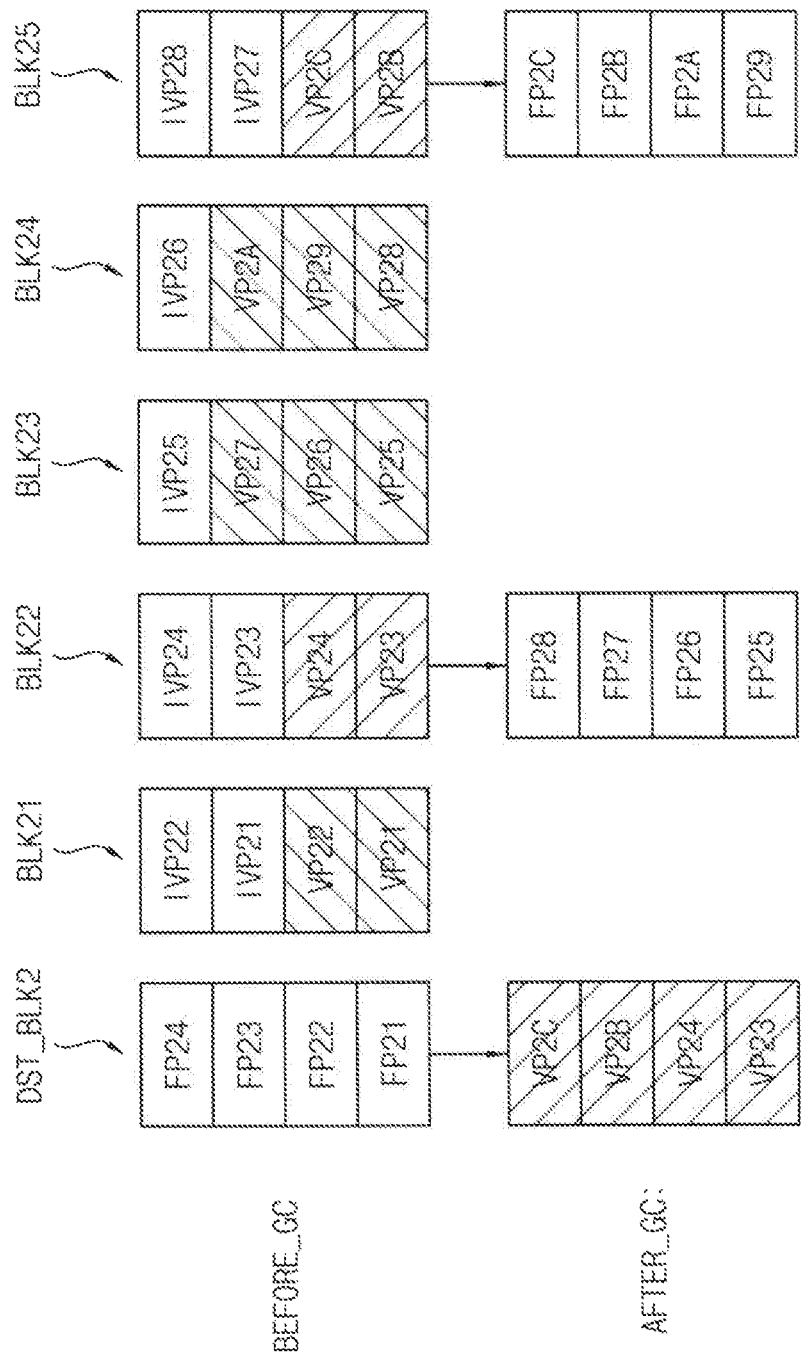
FIG. 4 is a diagram for describing another example of a method of performing garbage collection according to example embodiments.

FIG. 4 is a diagram for describing another example of a method of performing garbage collection according to example embodiments.

Referring to FIGS. 1, 3 and 4, the nonvolatile memory device included in the storage device may include a plurality of memory blocks DST_BLK2, BLK21, BLK22, BLK23, BLK24 and BLK25. Each memory block may include a plurality of pages.

Before the garbage collection operation is performed, the memory block DST_BLK2 may include free pages FP21, FP22, FP23 and FP24, the memory block BLK21 may include valid pages VP21 and VP22 and invalid pages IVP21 and IVP22, the memory block BLK22 may include valid pages VP23 and VP24 and invalid pages IVP23 and IVP24, the memory block BLK23 may include valid pages VP25, VP26 and VP27 and an invalid page IVP25, the memory block BLK24 may include valid pages VP28, VP29 and VP2A and an invalid page IVP26, and the memory block BLK25 may include valid pages VP2B and VP2C and invalid pages IVP27 and IVP28. In addition, based on the multi-stream scheme, the valid pages VP21, VP22, VP25, VP26, VP27, VP28, VP29 and VP2A included in the memory blocks BLK21, BLK23 and BLK24 may store data with a first stream, and the valid pages VP23, VP24, VP2B and VP2C included in the memory blocks BLK22 and BLK25 may store data with a second stream that is different from the first stream.

Unlike an example of FIG. 2, there is a situation in an example of FIG. 4 in which the garbage collection operation can be performed on the memory blocks BLK21, BLK23 and BLK24 that store the data with the first stream or on the memory blocks BLK22 and BLK25 that store the data with the second stream. In this example, based on the garbage collection expected cost described with reference to FIG. 3, one of a first group of the memory blocks BLK21, BLK23 and BLK24 and a second group of the memory blocks BLK22 and BLK25 may be selected as the victim memory blocks.

The garbage collection expected cost may be calculated based on the number (or quantity) of valid pages included in the same group of memory blocks. In some example embodiments, the storage device may calculate the garbage collection expected cost as a sum of the number of valid pages included in the same group of memory blocks. In other example embodiments, the storage device may calculate the garbage collection expected cost as a sum of ratios of the valid pages included in the same group of memory blocks, which may be obtained by dividing the sum of the number of valid pages included in the same group of memory blocks by the number of pages included in one memory block.

In operation S110, the storage device may calculate the first garbage collection expected cost for the first stream and for the data with the first stream that are stored in the first group of the memory blocks BLK21, BLK23 and BLK24. For example, when the garbage collection expected cost is represented as the sum of the number of valid pages, the first garbage collection expected cost may be 8, which corresponds to the sum of the number of valid pages (e.g., the valid pages VP21, VP22, VP25, VP26, VP27, VP28, VP29 and VP2A). For another example, when the garbage collection expected cost is represented as the sum of the ratios of valid pages, since one memory block includes four pages in FIG. 4, the first garbage collection expected cost may be 2 or 200%, which is obtained by dividing the sum of the number of valid pages (e.g., the 8 valid pages VP21, VP22, VP25, VP26, VP27, VP28, VP29 and VP2A) by the number of pages (e.g., 4) included in one memory block.

Similarly, in operation S120, the storage device may calculate the second garbage collection expected cost for the second stream and for the data with the second stream that are stored in the second group of the memory blocks BLK22 and BLK25. For example, the second garbage collection expected cost may be 4, which corresponds to the sum of the number of valid pages (e.g., the valid pages VP23, VP24, VP2B and VP2C). For another example, the second garbage collection expected cost may be 1 or 100%, which is obtained by dividing the sum of the number of valid pages (e.g., the 4 valid pages VP23, VP24, VP2B and VP2C) by the number of pages (e.g., 4) included in one memory block.

In operation S130, the storage device may select the victim memory blocks based on the first garbage collection expected cost and the second garbage collection expected cost. In an example of FIG. 4, the second garbage collection expected cost is less than the first garbage collection expected cost, and, thus, the storage device may select the second group of the memory blocks BLK22 and BLK25 storing the data with the second stream as the victim memory blocks.

The garbage collection expected cost may represent the sum of the number of valid pages that are copied for obtaining or preparing one free memory block. Since an efficiency of the garbage collection operation increases as the sum of the number of valid pages that are copied for obtaining or preparing one free memory block decreases, memory blocks that correspond to a stream having a relatively low garbage collection expected cost may be selected as the victim memory blocks, and then the garbage collection operation may be performed on the victim memory blocks.

In operation S200, the storage device may perform the garbage collection operation on the memory blocks BLK22 and BLK25 that are selected as the victim memory blocks. For example, the memory block DST_BLK2 may be used as a destination memory block for the garbage collection operation.

For example, the valid pages VP23 and VP24 included in the memory block BLK22 may be copied into the memory block DST_BLK2, and the data erase operation may be performed on the memory block BLK22 to change the memory block BLK22 to a free memory block. Similarly, the valid pages VP2B and VP2C included in the memory block BLK25 may be copied into the memory block DST_BLK2, and the data erase operation may be performed on the memory block BLK25 to change the memory block BLK25 to a free memory block.

As a result, after the garbage collection operation is performed, the memory block DST_BLK2 may include the valid pages VP23, VP24, VP2B and VP2C, the memory block BLK22 may include free pages FP25, FP26, FP27 and FP28, and the memory block BLK25 may include free pages FP29, FP2A, FP2B and FP2C. Although not illustrated in FIG. 4, states of data stored in the memory blocks BLK21, BLK23 and BLK24 after the garbage collection operation may be substantially the same as states of data stored in the memory blocks BLK21, BLK23 and BLK24 before the garbage collection operation, respectively.

Although FIGS. 3 and 4 illustrate an example where two candidate groups of memory blocks are selectable as the victim memory blocks, the example embodiments may not be limited thereto, and three or more two candidate groups of memory blocks may be selectable as the victim memory blocks. For example, a garbage collection expected cost may be calculated for each of the three or more two candidate groups of memory blocks, and one group of memory blocks that correspond to a stream having the lowest garbage collection expected cost may be selected as the victim memory blocks.

Although FIGS. 2 and 4 illustrate examples where the storage device includes the specific number of memory blocks and each memory block includes four pages, the example embodiments may not be limited thereto, and the number of memory blocks included in the storage device and/or the number of pages included in each memory block may be changed according to example embodiments.

Figure 5:
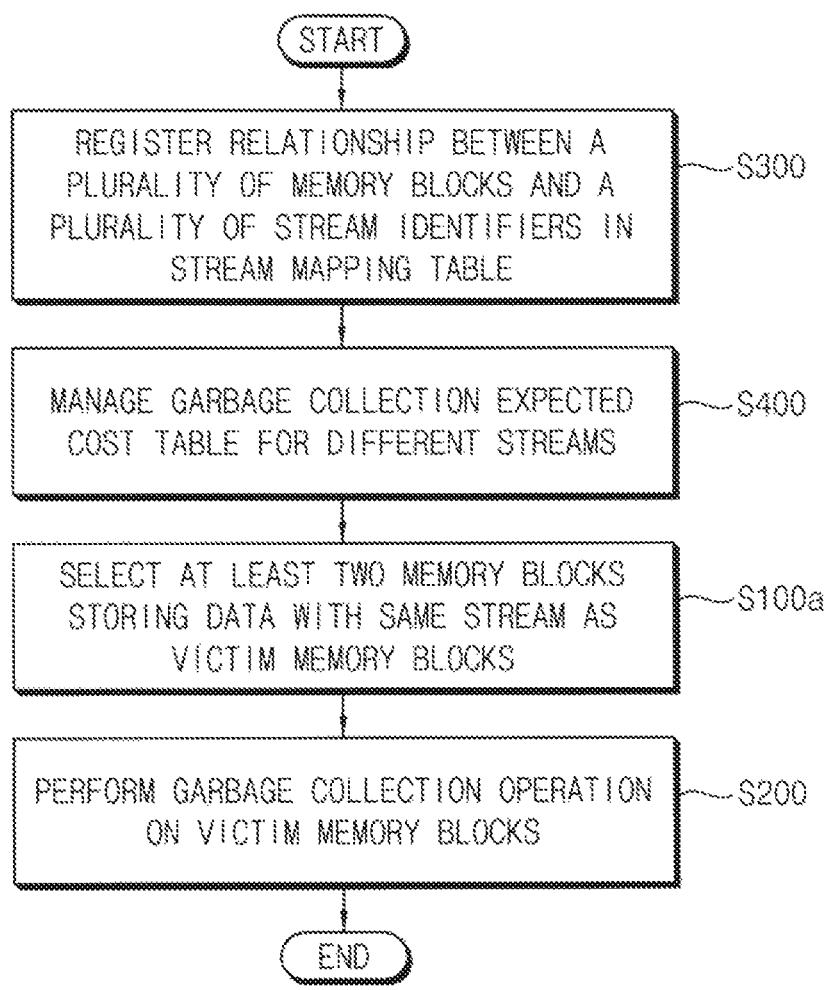
FIG. 5 is a flow chart illustrating a method of performing garbage collection according to example embodiments.

FIG. 5 is a flow chart illustrating a method of performing garbage collection according to example embodiments.

Referring to FIG. 5, a method of performing garbage collection according to example embodiments is executed by a storage device that includes a nonvolatile memory device including a plurality of memory blocks. The storage device is configured to operate based on a multi-stream scheme in which a plurality of data written into the plurality of memory blocks are classified into and managed by a plurality of streams and data with a single stream are written into a single memory block.

In operation S300, the storage device may register a relationship between the plurality of memory blocks and a plurality of stream identifiers (IDs) in a stream mapping table by matching each of the plurality of stream IDs into a respective one of the plurality of memory blocks. The plurality of stream IDs represent the plurality of streams, respectively.

In operation S400, the storage device may manage a garbage collection expected cost table for different streams. The garbage collection expected cost table represents garbage collection expected costs for the plurality of streams. The stream mapping table will be described in detail with reference to FIGS. 6 and 7, and the garbage collection expected cost table will be described in detail with reference to FIGS. 8 and 9.

In some example embodiments, the storage device may update the stream mapping table and the garbage collection expected cost table whenever at least one of the plurality of memory blocks is assigned for a data write operation or becomes a free memory block. In other words, the storage device may update the stream mapping table and the garbage collection expected cost table in real-time (or during runtime) while the storage device is powered on and operates.

In operation S100a, the storage device may select at least two memory blocks among the plurality of memory blocks as victim memory blocks such that the at least two memory blocks selected as the victim memory blocks store data with the same stream.

Step S100a in FIG. 5 may be similar to step S100 in FIG. 1. In step S100 in FIG. 1, the garbage collection expected cost may be calculated on the fly whenever the garbage collection operation is required, as described with reference to FIGS. 3 and 4. In step S100a in FIG. 5, the garbage selection costs may be updated and stored in the garbage collection expected cost table, and, thus, the storage device may select the victim memory blocks without waiting to calculate the garbage collection expected cost on the fly. Therefore, the garbage collection operation may be more rapidly and expeditiously performed.

In operation S200, as discussed above with regards to FIG. 1, a garbage collection operation is performed on the victim memory blocks. Step S200 in FIG. 5 may be substantially the same as step S200 in FIG. 1, and, thus, repeated description herein with be omitted for the sake of brevity.

Figure 6:
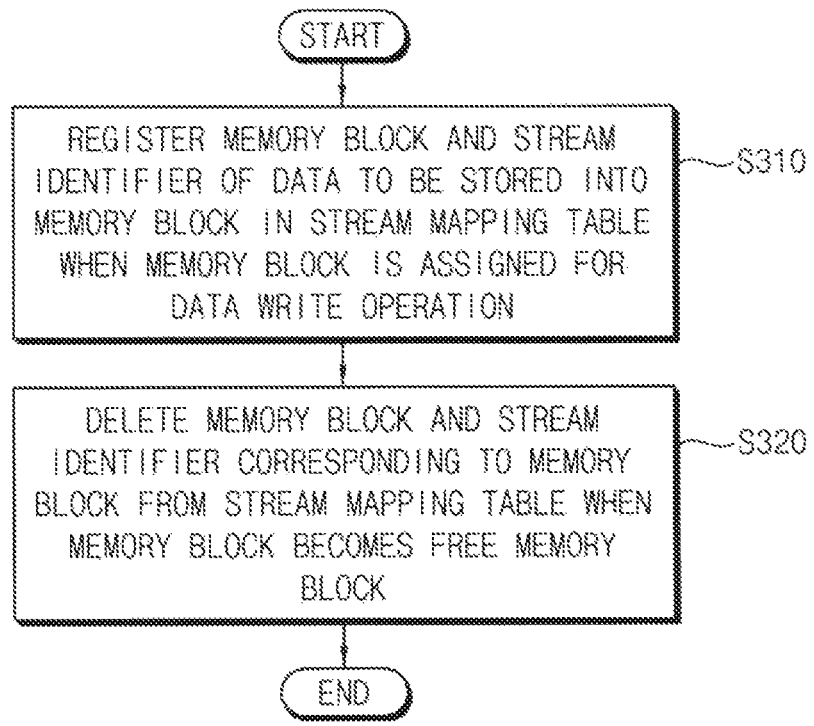
FIG. 6 is a flow chart illustrating an example of registering a relationship between a plurality of memory blocks and a plurality of stream IDs in a stream mapping table in the method of FIG. 5.
Figure 7:
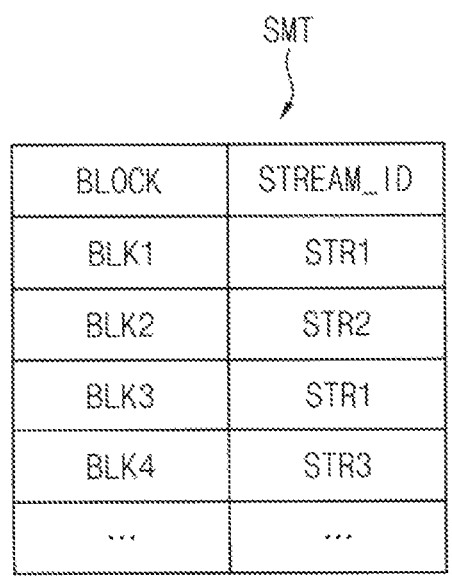
FIG. 7 is a table illustrating an example of a stream mapping table in the method of FIG. 5.

FIG. 6 is a flow chart illustrating an example of registering a relationship between a plurality of memory blocks and a plurality of stream IDs in a stream mapping table in the method of FIG. 5. FIG. 7 is a table illustrating an example of a stream mapping table in the method of FIG. 5.

Referring to FIGS. 5, 6 and 7, a stream mapping table SMT may include used memory blocks BLOCK among the plurality of memory blocks and a plurality of stream IDs STREAM_ID. Each of the plurality of stream IDs STREAM_ID may represents a stream of data stored in a respective one of the used memory blocks BLOCK. In other words, the stream mapping table SMT may include a one-to-one correspondence between the used memory blocks BLOCK and the plurality of stream IDs STREAM_ID. As with the plurality of stream IDs STREAM_ID, the used memory blocks BLOCK may be registered based on memory block IDs.

As discussed above, in operation S300, the storage device may register the relationship between the plurality of memory blocks and the plurality of stream IDs in the stream mapping table.

For example, in operation S310, the storage device may register a memory block and a stream ID of data to be stored into the memory block in the stream mapping table when the memory block is assigned for a data write operation. The storage device may perform operation S310 at a time point at which the data write operation for the memory block is initially requested.

For example, at a time point at which the data write operation for a first memory block BLK1 among the plurality of memory blocks is initially requested, the first memory block BLK1 may be assigned for storing first data with a first stream, and thus the first memory block BLK1 and a first stream ID STR1 representing the first stream may be registered in the stream mapping table SMT. Similarly, at a time point at which the data write operation for a second memory block BLK2 among the plurality of memory blocks is initially requested, the second memory block BLK2 and a second stream ID STR2 representing a second stream may be registered in the stream mapping table SMT. At a time point at which the data write operation for a third memory block BLK3 is initially requested, the third memory block BLK3 and the first stream ID STR1 representing the first stream may be registered in the stream mapping table SMT. At a time point at which the data write operation for a fourth memory block BLK4 is initially requested, the fourth memory block BLK4 and a third stream ID STR3 representing a third stream may be registered in the stream mapping table SMT. In an example of FIG. 7, the first memory block BLK1 and the third memory block BLK3 may store data with the same stream (e.g., the first stream corresponding to the first stream ID STR1).

In operation S320, the storage device may delete a memory block and a stream ID corresponding to the memory block from the stream mapping table when the memory block becomes a free memory block. Step S320 may be performed at a time point at which the data erase operation for the memory block is completed.

For example, at a time point at which the data erase operation for the first memory block BLK1 is completed, the first memory block BLK1 and the first stream ID STR1 may be deleted from the stream mapping table SMT. Similarly, at a time point at which the data erase operation for the second memory block BLK2 is completed, the second memory block BLK2 and the second stream ID STR2 may be deleted from the stream mapping table SMT. At a time point at which the data erase operation for the third memory block BLK3 is completed, the third memory block BLK3 and the first stream ID STR1 may be deleted from the stream mapping table SMT. At a time point at which the data erase operation for the fourth memory block BLK4 is completed, the fourth memory block BLK4 and the third stream ID STR3 may be deleted from the stream mapping table SMT.

In some example embodiments, the stream mapping table SMT may be provided as a type of meta data.

Figure 8:
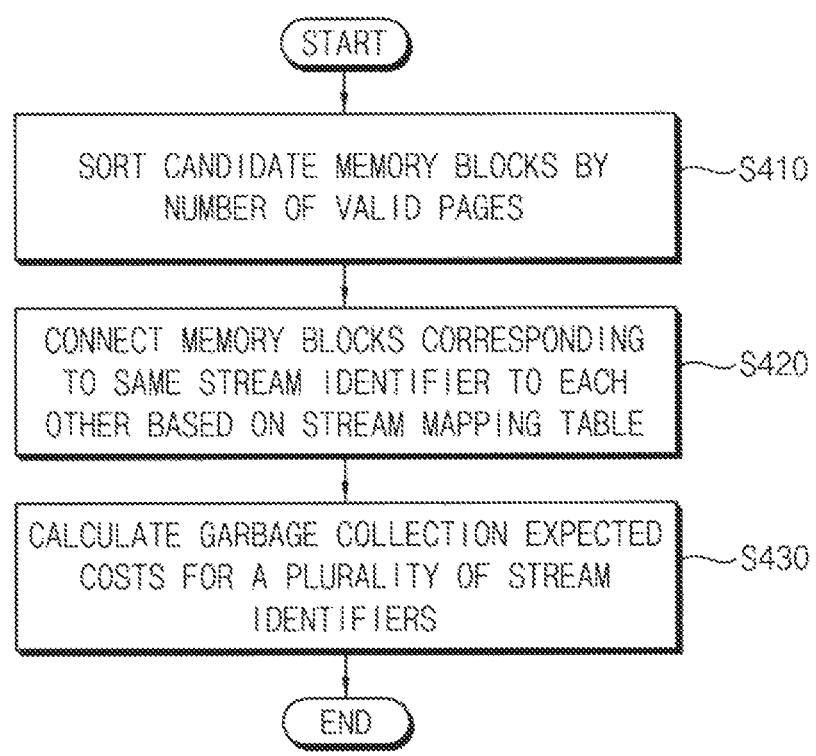
FIG. 8 is a flow chart illustrating an example of managing a garbage collection expected cost table in the method of FIG. 5.
Figure 9:
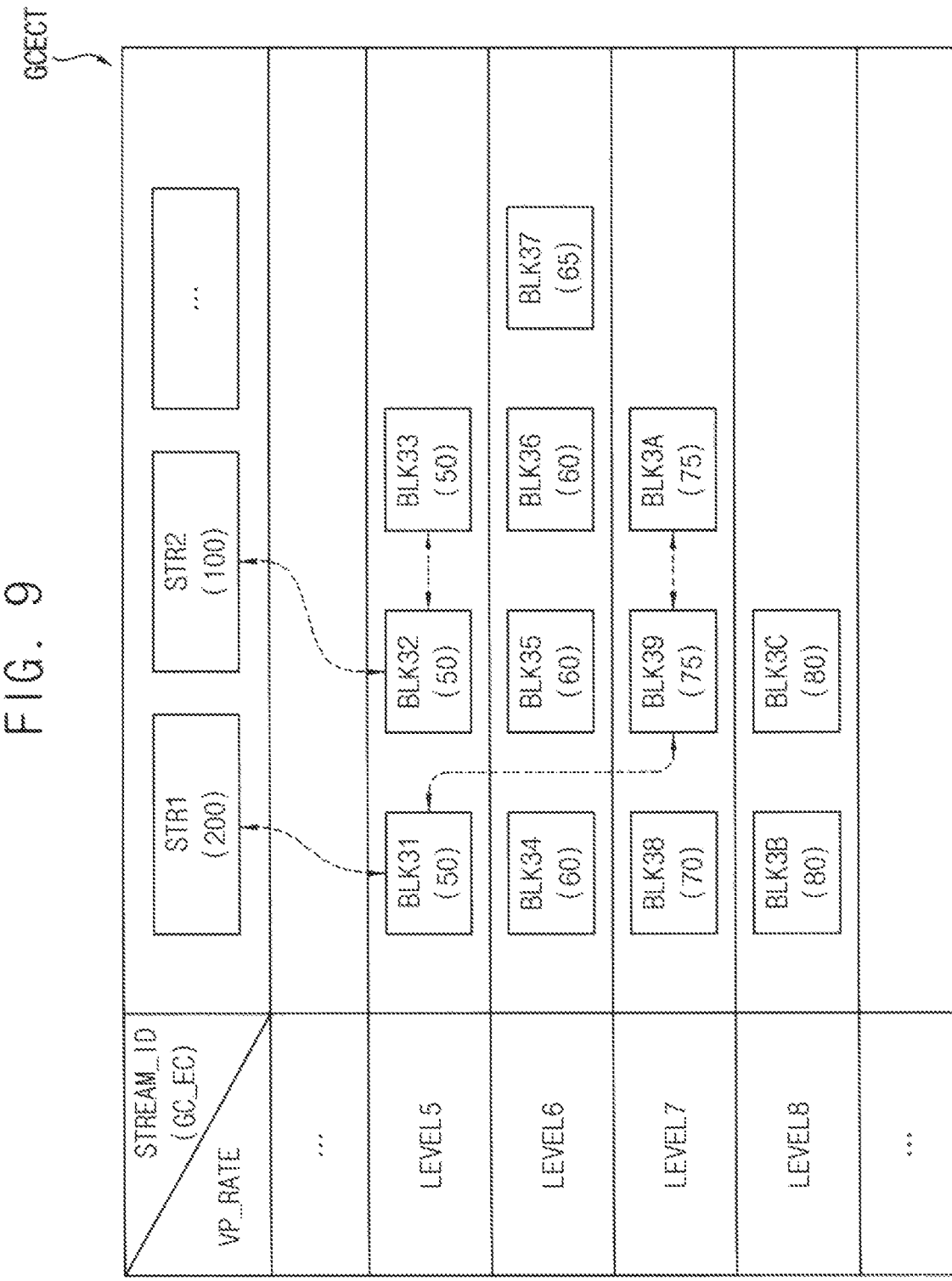
FIG. 9 is a table illustrating an example of a garbage collection expected cost table in the method of FIG. 5.

FIG. 8 is a flow chart illustrating an example of managing a garbage collection expected cost table in the method of FIG. 5. FIG. 9 is a table illustrating an example of a garbage collection expected cost table in the method of FIG. 5.

Referring to FIGS. 5, 8 and 9, a garbage collection expected cost table GCECT may include candidate memory blocks BLK31, BLK32, BLK33, BLK34, BLK35, BLK36, BLK37, BLK38, BLK39, BLK3A, BLK3B and BLK3C among the plurality of memory blocks, a connection (e.g., dotted lines and arrows in FIG. 9) of memory blocks corresponding to the same stream ID, and garbage collection expected costs GC_EC for the plurality of stream IDs STREAM_ID. The candidate memory blocks may represent memory blocks that are actually used and selectable for the garbage collection operation, and may be sorted by the number of valid pages.

In FIG. 9, "VP_RATE" represents a ratio of the number (or quantity) of valid pages to total pages in one memory block. For convenience of description, the ratio of the valid pages to the total pages is illustrated in FIG. 9 because the total number of pages in one memory block is changed by various implementations. In "VP_RATE" in FIG. 9, "LEVEL5" represents a candidate memory block in which the ratio of the valid pages to the total pages is greater than or equal to about 50% and less than about 60%. "LEVEL6" represents a candidate memory block in which the ratio of the valid pages to the total pages is greater than or equal to about 60% and less than about 70%. "LEVEL7" represents a candidate memory block in which the ratio of the valid pages to the total pages is greater than or equal to about 70% and less than about 80%. "LEVEL8" represents a candidate memory block in which the ratio of the valid pages to the total pages is greater than or equal to about 80% and less than about 90%. Although not illustrated in FIG. 9, "LEVEL0," "LEVEL1," "LEVEL2," "LEVEL3," "LEVEL4" and "LEVEL5" may be further included in the garbage collection expected cost table GCECT.

As discussed above in reference to FIG. 5, in operation S400 the storage device may manage the garbage collection expected cost table.

For example, in operation S410, the storage device may sort the candidate memory blocks BLK31, BLK32, BLK33, BLK34, BLK35, BLK36, BLK37, BLK38, BLK39, BLK3A, BLK3B and BLK3C that represent selectable memory blocks for the garbage collection operation by the number of valid pages. For example, the candidate memory blocks BLK31, BLK32 and BLK33 in which the ratio of the valid pages to the total pages is 50% may be arranged in a section "LEVEL5." The candidate memory blocks BLK34, BLK35 and BLK36 in which the ratio of the valid pages to the total pages is 60% and the candidate memory block BLK37 in which the ratio of the valid pages to the total pages is 65% may be arranged in a section "LEVEL6." The candidate memory block BLK38 in which the ratio of the valid pages to the total pages is 70% and the candidate memory blocks BLK39 and BLK3A in which the ratio of the valid pages to the total pages is 75% may be arranged in a section "LEVEL7." The candidate memory blocks BLK3B and BLK3B in which the ratio of the valid pages to the total pages is 80% may be arranged in a section "LEVEL8."

In operation S420, the storage device may connect memory blocks corresponding to the same stream ID together based on the stream mapping table (e.g., the stream mapping table SMT in FIG. 7). For example, the candidate memory blocks BLK31, BLK39 and BLK3A may correspond to the first stream ID STR1 representing the first stream, and thus the first stream ID STR1 and the candidate memory blocks BLK31, BLK39 and BLK3A may be connected to each other, as illustrated in FIG. 9. Similarly, the candidate memory blocks BLK32 and BLK33 may correspond to the second stream ID STR2 representing the second stream, and thus the second stream ID STR2 and the candidate memory blocks BLK32 and BLK33 may be connected to each other, as illustrated in FIG. 9.

In operation S430, the storage device may calculate the garbage collection expected costs GC_EC for the plurality of stream IDs STREAM_ID. As described with reference to FIG. 4, the garbage collection expected cost may be the sum of the number of valid pages or the sum of the ratios of valid pages. For example, when the garbage collection expected cost is represented as the sum of the ratios of valid pages, a first garbage collection expected cost for the first stream ID STR1 may be 200%, and a second garbage collection expected cost for the second stream ID STR2 may be 100%, as illustrated in FIG. 9. For another example, when the garbage collection expected cost is represented as the sum of the number of valid pages, and when one memory block includes K pages where K is a natural number, a first garbage collection expected cost for the first stream ID STR1 may be 2*K, and a second garbage collection expected cost for the second stream ID STR2 may be K.

In selecting the victim memory blocks (e.g., in step S100a), the storage device may search the garbage collection expected cost table GCECT to determine whether there are stream IDs that satisfy a first condition in which a sum of the number (or ratios) of invalid pages is greater than or equal to a reference value, and memory blocks corresponding to one of the stream IDs that satisfy the first condition may be selected as the victim memory blocks. For example, memory blocks corresponding to one stream ID that satisfy the first condition may be selected as the victim memory blocks, and the one stream ID may have the lowest garbage collection expected cost.

In some example embodiments, the reference value may correspond to a value for obtaining or preparing one free memory block. For example, when the garbage collection expected cost is represented as the sum of the ratios of valid pages, the reference value may be 100%. For another example, when the garbage collection expected cost is represented as the sum of the number of valid pages, and when one memory block includes K pages where K is a natural number, the reference value may be K. In other words, it may be determined whether there is at least one group of candidate memory blocks capable of obtaining or preparing one free memory block.

In an example of FIG. 9, the candidate memory blocks BLK31, BLK39 and BLK3A corresponding to the first stream ID STR1 may include 50%, 25% and 25% of invalid pages, respectively, and thus the first stream ID STR1 may satisfy the first condition. In addition, the candidate memory blocks BLK32 and BLK33 corresponding to the second stream ID STR2 may include 50% and 50% of invalid pages, respectively, and thus the second stream ID STR2 may also satisfy the first condition. The candidate memory blocks BLK32 and BLK33 that correspond to the second stream ID STR2 having a relatively low garbage collection expected cost may be selected as the victim memory blocks, and thus the garbage collection operation may be performed on the memory blocks BLK32 and BLK33.

Although not illustrated in FIG. 9, if there is only one stream ID that satisfies the first condition, memory blocks corresponding to the one stream ID may be selected as the victim memory blocks, without comparing the garbage collection expected costs. If there is no stream ID that satisfies the first condition, the victim memory blocks cannot be selected, and thus the garbage collection operation may not be performed.

In some example embodiments, the garbage collection expected cost table GCECT may be provided as a type of meta data.

Figure 10:
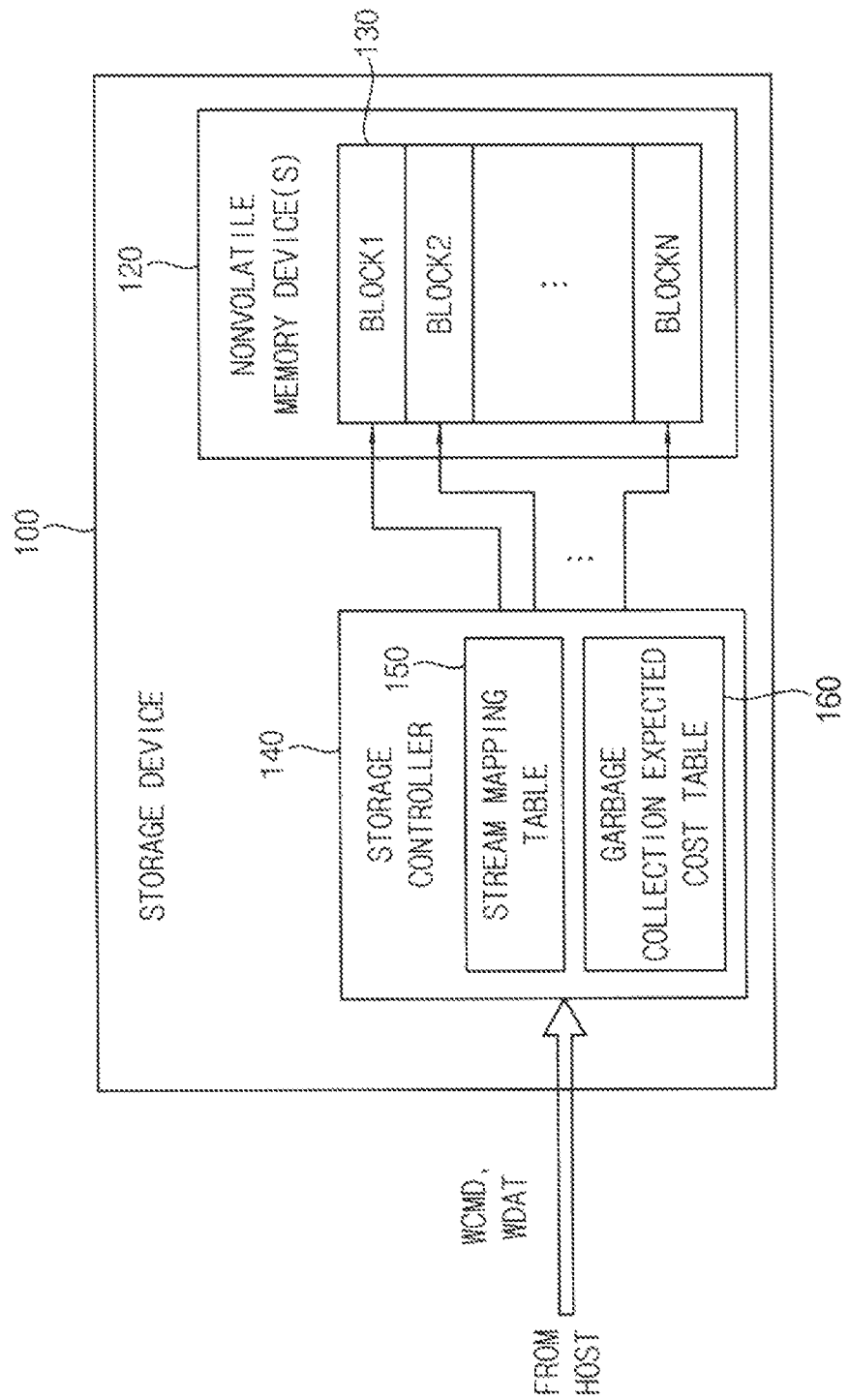
FIG. 10 is a block diagram illustrating a storage device according to example embodiments.

FIG. 10 is a block diagram illustrating a storage device according to example embodiments.

Referring to FIG. 10, a storage device 100 according to example embodiments includes at least one nonvolatile memory device 120 that includes a plurality of memory blocks (BLOCK1, BLOCK2, . . . , BLOCKN) 130 each having a plurality of nonvolatile memory cells, and a storage controller 140 that controls the nonvolatile memory device 120.

In some example embodiments, the storage device 100 may be one of a solid state drive (SSD), a multi media card (MMC), an embedded multi media card (eMMC) and a universal flash storage (UFS). In other example embodiments, the storage device 100 may be a secure digital (SD) card, a micro SD card, a memory stick, a chip card, a universal serial bus (USB) card, a smart card, a compact flash (CF) card, or the like.

As discussed in more detail below with reference to FIG. 13, the storage controller 140 may include a memory and processing circuitry.

The memory may include at least one of a volatile memory, non-volatile memory, random access memory (RAM), a flash memory, a hard disk drive, and an optical disk drive. The memory may store a stream mapping table 150 and a garbage collection expected cost table 160.

The processing circuitry may be, but not limited to, a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The processing circuitry may be configured, through a layout design or execution of computer readable instructions stored in a memory (not shown), as a special purpose computer to control the operation of the non-volatile memory device 120 by performing one or more of a data write or read operation based on a multi-stream scheme, and perform a garbage collection operation in view of the multi-stream scheme.

The storage controller 140 controls an operation of the nonvolatile memory device 120, e.g., a data write or read operation, based on a command and data that are received from a host. For example, the storage controller 140 may receive a write command WCMD for requesting the data write operation and write data WDAT to be stored into the nonvolatile memory device 120 from the host, and may store the write data WDAT into at least one of the plurality of memory blocks 130.

In some example embodiments, the host may be one of various electronic systems such as a personal computer, a laptop computer, a mobile phone, a smart phone, a tablet computer, a personal digital assistants (PDA), an enterprise digital assistant (EDA), a portable multimedia player (PMP), a digital camera, a music player, a portable game console, a navigation device, a wearable device, an internet of things (IoT) device, an internet of everything (IoE) device, an e-book, a virtual reality (VR) device, an augmented reality (AR) device, etc.

The storage controller 140 controls the nonvolatile memory device 120 such that the nonvolatile memory device 120 operates based on the multi-stream scheme. For example, based on the multi-stream scheme, the storage device 100 or the host may classify the write data WDAT into a plurality of streams, and data with a single stream may be written into a single memory block. For example, as will be described with reference to FIG. 14, the host may provide the write data WDAT and a plurality of stream IDs, each of which represents a respective one of the plurality of streams. Alternatively, the storage controller 140 may set the plurality of streams of the write data WDAT by itself.

In addition, in example embodiments, the storage controller 140 controls the nonvolatile memory device 120 such that the nonvolatile memory device 120 performs the garbage collection operation. The storage controller 140 may perform the garbage collection operation based on the method described with reference to FIGS. 1 through 9.

For example, the storage controller 140 may select at least two memory blocks among the plurality of memory blocks 130 as the victim memory blocks, and the garbage collection operation may be performed on the victim memory blocks. If there are two or more groups of candidate memory blocks, the storage controller 140 may calculate the garbage collection expected costs for selecting the victim memory blocks, and may use the stream mapping table 150 and the garbage collection expected cost table 160 to calculate the garbage collection expected costs.

After the storage device 100 performs the garbage collection operation, each memory block included in the storage device 100 may only store the data with the same stream, and the plurality of memory blocks 130 may be continuously and consistently classified into and managed by the plurality of streams. Thus, the storage device 100 may have relatively improved and enhanced performance and durability.

Although not illustrated in FIG. 10, the garbage collection expected cost table 160 may be replaced with a garbage collection expected cost calculator that calculates the garbage collection expected cost on the fly whenever the garbage collection operation is required.

Figure 11:
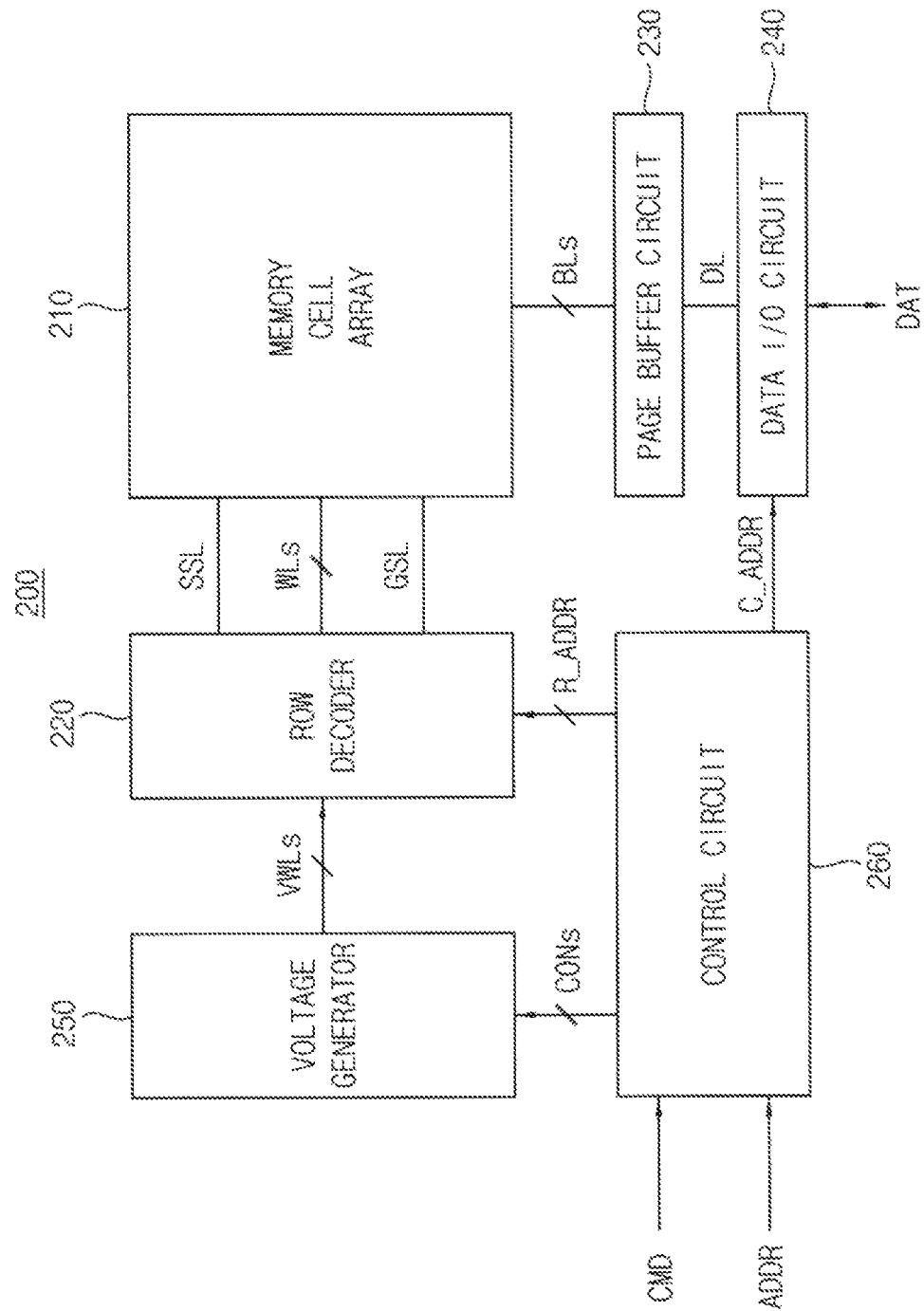
FIG. 11 is a block diagram illustrating an example of a nonvolatile memory device that is included in the storage device of FIG. 10.

FIG. 11 is a block diagram illustrating an example of a nonvolatile memory device that is included in the storage device of FIG. 10.

Referring to FIG. 11, a nonvolatile memory device 200 may include a memory cell array 210, a row decoder 220, a page buffer circuit 230, a data input/output (I/O) circuit 240, a voltage generator 250 and a control circuit 260.

The memory cell array 210 may be connected to the row decoder 220 via a string selection line SSL, a plurality of wordlines WLs and a ground selection line GSL. The memory cell array 210 may be further connected to the page buffer circuit 230 via a plurality of bitlines BLs.

The memory cell array 210 may include a plurality of nonvolatile memory cells that are connected to the plurality of wordlines WLs and the plurality of bitlines BLs. As will be described with reference to FIGS. 12A and 12B, the plurality of nonvolatile memory cells may be arranged in a two-dimensional (2D) array structure or a three-dimensional (3D) vertical array structure.

The control circuit 260 may receive a command CMD and an address ADDR from a storage controller (e.g., the storage controller 140 in FIG. 10), and may control the row decoder 220, the page buffer circuit 230, the data I/O circuit 240 and the voltage generator 250 based on the command CMD and the address ADDR to perform data write (or program)/read/erase operations for the memory cell array 210.

For example, the control circuit 260 may generate control signals CONs for controlling the voltage generator 250 based on the command CMD, and may generate a row address R_ADDR and a column address C_ADDR based on the address ADDR. The control circuit 260 may provide the row address R_ADDR to the row decoder 220, and may provide the column address C_ADDR to the data I/O circuit 240.

The row decoder 220 may be connected to the memory cell array 210 via the string selection line SSL, the plurality of wordlines WLs and the ground selection line GSL. The row decoder 220 may determine at least one of the plurality of wordlines WLs as a selected wordline, and may determine the rest of the plurality of wordlines WLs as unselected wordlines, based on the row address R_ADDR.

The voltage generator 250 may generate wordline voltages VWLs that are required for an operation of the nonvolatile memory device 200 based on the control signals CONs. The wordline voltages VWLs may be applied to the plurality of wordlines WLs via the row decoder 220.

For example, during the data erase operation, the voltage generator 250 may apply an erase voltage to a well or a common source line of a memory block, and may apply a ground voltage to entire wordlines of the memory block. During an erase verification operation, the voltage generator 250 may apply an erase verification voltage to all of the wordlines of the memory block or sequentially apply the erase verification voltage on a wordline-by-wordline basis. During the data program operation (or the data write operation), the voltage generator 250 may apply a program voltage to the selected wordline, and may apply a program pass voltage to the unselected wordlines. During a program verification operation, the voltage generator 250 may apply a program verification voltage to the selected wordline, and may apply a verification pass voltage to the unselected wordlines. During the data read operation, the voltage generator 250 may apply a read voltage to the selected wordline, and may apply a read pass voltage to the unselected wordlines.

The page buffer circuit 230 may be connected to the memory cell array 210 via the plurality of bitlines BLs. The page buffer circuit 230 may include a plurality of page buffers. In some example embodiments, each page buffer may be connected to one bitline. In other example embodiments, each page buffer may be connected to two or more bitlines.

The page buffer circuit 230 may store data DAT to be programmed into the memory cell array 210 or may read data DAT sensed from the memory cell array 210. In other words, the page buffer circuit 230 may operate as a write driver or a sensing amplifier according to an operation mode of the nonvolatile memory device 200.

The data I/O circuit 240 may be connected to the page buffer circuit 230 via a data line DL. The data I/O circuit 240 may provide the data DAT from an outside of the nonvolatile memory device 200 (e.g., from the storage controller 140 in FIG. 10) to the memory cell array 210 via the page buffer circuit 230 or may provide the data DAT from the memory cell array 210 to the outside of the nonvolatile memory device 100, based on the column address C_ADDR.

Figure 12A:
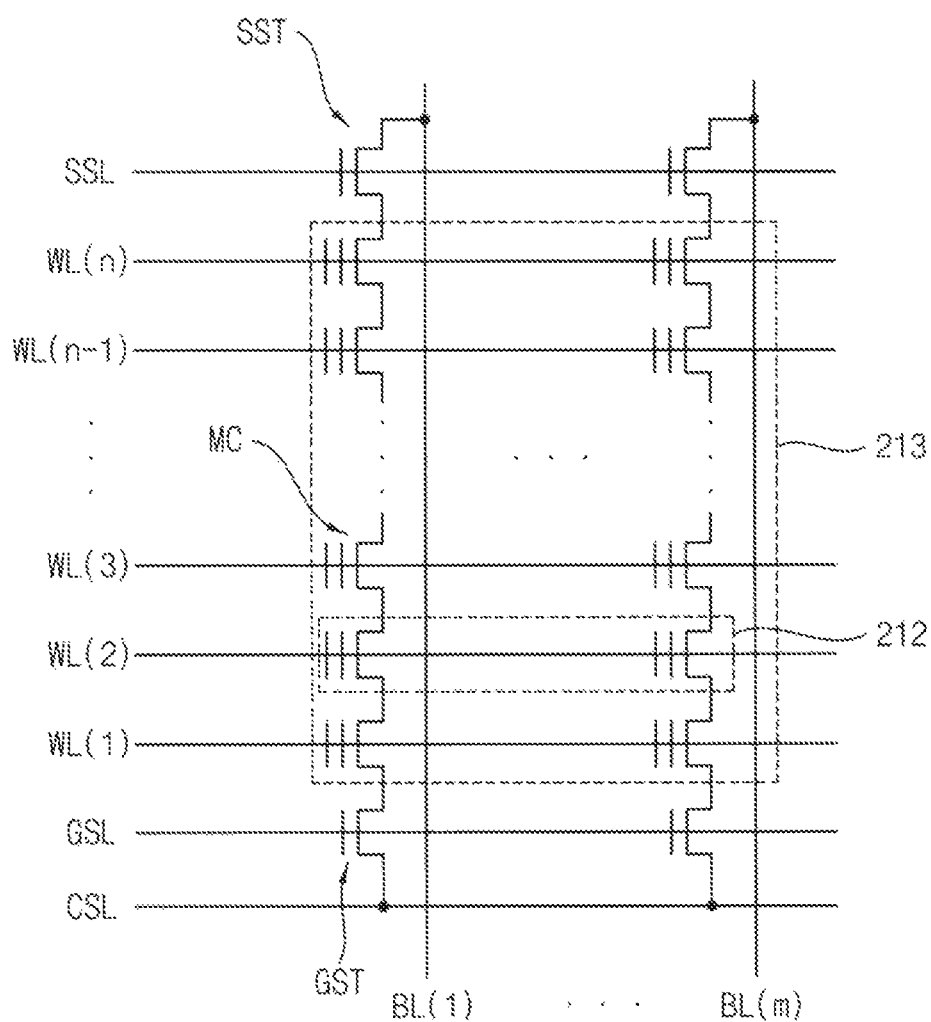
FIGS. 12A and 12B are diagrams illustrating examples of a memory cell array that is included in the nonvolatile memory device of FIG. 11.
Figure 12B:
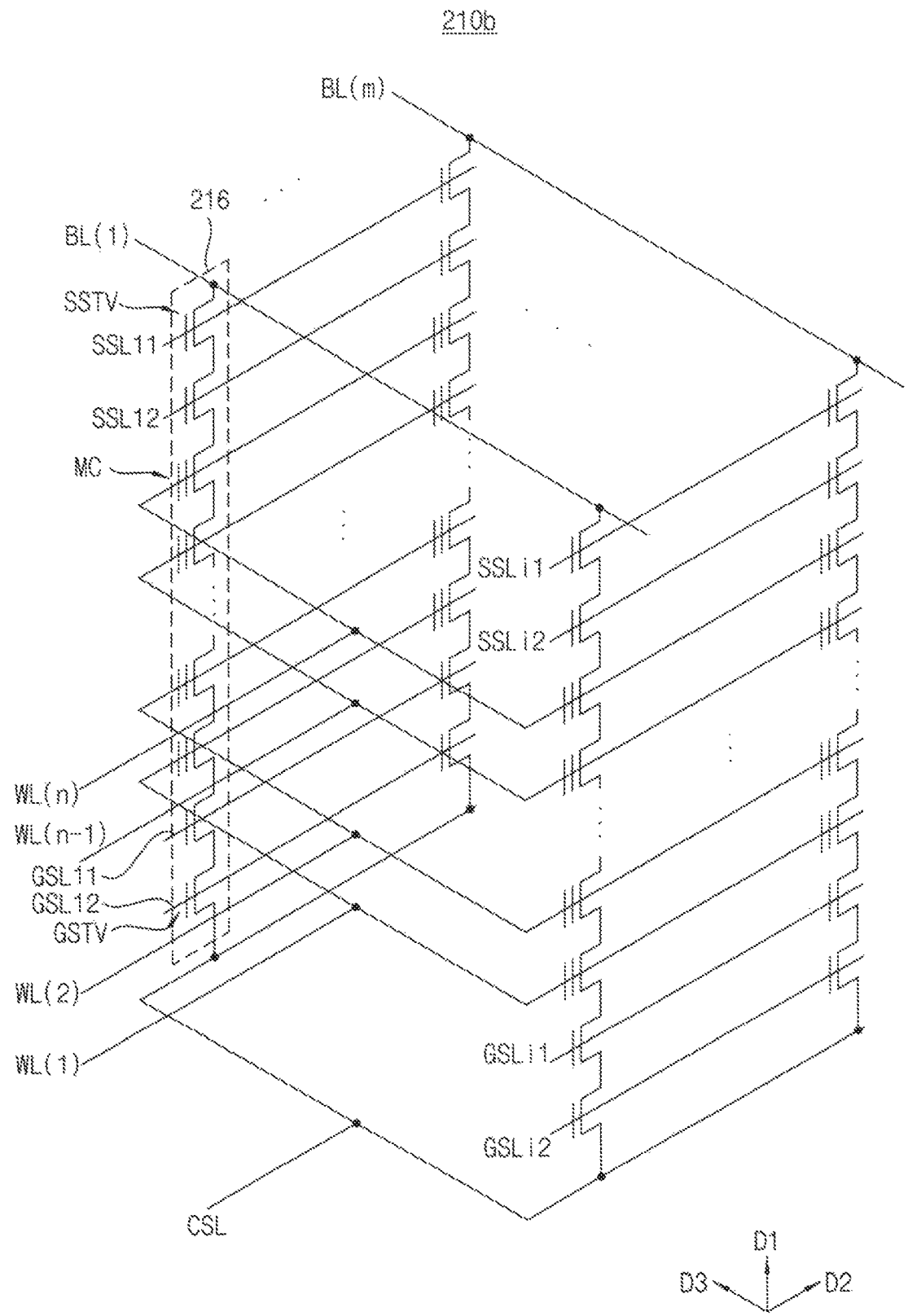

FIGS. 12A and 12B are diagrams illustrating examples of a memory cell array that is included in the nonvolatile memory device of FIG. 11. FIG. 12A is a circuit diagram illustrating an example of a memory cell array included in a NAND flash memory device. FIG. 12B is a circuit diagram illustrating an example of a memory cell array included in a vertical NAND flash memory device.

Referring to FIG. 12A, a memory cell array 210a may include string selection transistors SST, ground selection transistors GST, and memory cells MC. The string selection transistors SST may be connected to bitlines BL(1), . . . , BL(m), and the ground selection transistors GST may be connected to a common source line CSL. The memory cells arranged in the same row may be disposed in series between one of the bitlines BL(1)~BL(m) and the common source line CSL, and the memory cells arranged in the same column may be connected in common to one of wordlines WL(1), WL(2), WL(3), . . . , WL(n−1), WL(n). In other words, the memory cells MC may be connected in series between the string selection transistors SST and the ground selection transistors GST, and 16, 32, or 64 wordlines may be disposed between a string selection line SSL connected to the string selection transistors SST and a ground selection line GSL connected to the ground selection transistors GST.

The string selection transistors SST may be connected to the string selection line SSL such that the string selection transistors SST are controlled according to a level of a voltage applied from the string selection line SSL. The ground selection transistors GST may be connected to the ground selection line GSL such that the ground selection transistors GST are controlled according to a level of a voltage applied from the ground selection line GSL. The memory cells MC may be controlled according to levels of voltages applied to the wordlines WL(1)~WL(n).

The NAND flash memory device including the memory cell array 210a may perform the data read and write operations in units of page 212 and the data erase operation in units of block 213.

Referring to FIG. 12B, a memory cell array 210b may include a plurality of strings 216 having a vertical structure. The plurality of strings 216 may be formed in a second direction D2 such that a string row may be formed. A plurality of string rows may be formed in a third direction D3 such that a string array may be formed. Each of the strings 216 may include ground selection transistors GSTV, memory cells MC, and string selection transistors SSTV which are disposed in series in a first direction D1 between bitlines BL(1), . . . , BL(m) and a common source line CSL.

The ground selection transistors GSTV may be connected to ground selection lines GSL11, GSL12, . . . , GSLi1, GSLi2, and the string selection transistors SSTV may be connected to string selection lines SSL11, SSL12, . . . , SSLi1, SSLi2. The memory cells MC arranged on the same layer may be connected in common to one of wordlines WL(1), WL(2), . . . , WL(n−1), WL(n). The ground selection lines GSL11~GSLi2 and the string selection lines SSL11~SSLi2 may extend in the second direction D2 and may be formed along the third direction D3. The wordlines WL(1)~WL(n) may extend in the second direction D2 and may be formed along the first and third directions D1 and D3. The bitlines BL(1)~BL(m) may extend in the third direction D3 and may be formed along the second direction D2. The memory cells MC may be controlled according to levels of voltages applied to the wordlines WL(1)~WL(n).

A three-dimensional (3D) vertical array structure may include vertical NAND strings that are vertically oriented such that at least one memory cell is located over another memory cell. The at least one memory cell may include a charge trap layer. The following patent documents, which are hereby incorporated by reference in their entireties, describe suitable configurations for a memory cell array including a 3D vertical array structure, in which the 3D memory array is configured as a plurality of levels, with wordlines and/or bitlines shared between levels: U.S. Pat. Nos. 7,679,133, 8,553,466, 8,654,587, and 8,559,235, and US Pat. Pub. No. 2011/0233648.

Although the memory cell array included in the nonvolatile memory device according to example embodiments is described based on a flash memory device, the nonvolatile memory device according to example embodiments may be any nonvolatile memory device, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), etc.

Figure 13:
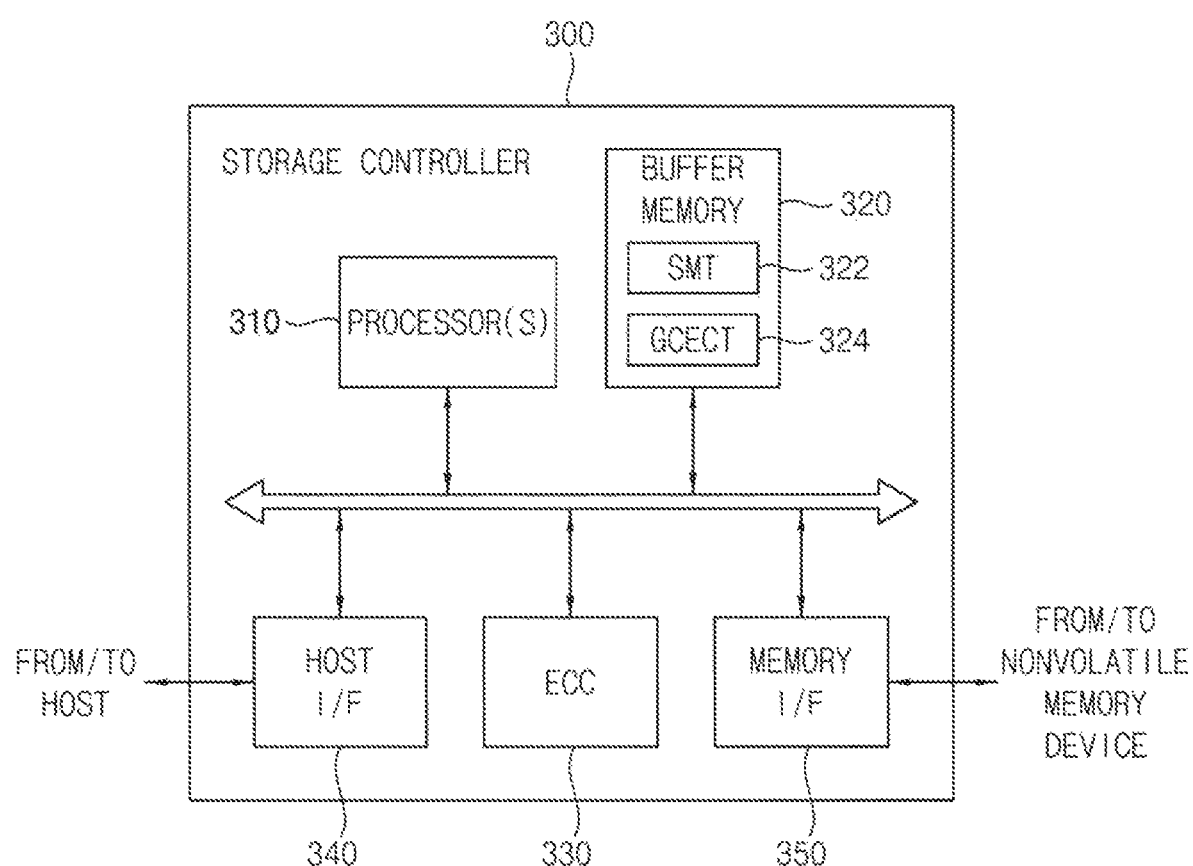
FIG. 13 is a block diagram illustrating an example of a storage controller that is included in the storage device of FIG. 10.

FIG. 13 is a block diagram illustrating an example of a storage controller that is included in the storage device of FIG. 10.

Referring to FIG. 13, a storage controller 300 may include at least one processor 310, a buffer memory 320, an error correction code (ECC) block 330, a host interface 340 and a memory interface 350.

The processor 310 may control an operation of the storage controller 300 in response to a command received via the host interface 340 from the host. In some example embodiments, the processor 310 may control respective components by employing firmware for operating the storage device 100.

The buffer memory 320 may store instructions and data executed and processed by the processor 310. For example, the buffer memory 320 may be implemented with a volatile memory device, such as a static random access memory (SRAM), a dynamic random access memory (DRAM), or the like. The buffer memory 320 may include a stream mapping table 322 and a garbage collection expected cost table 324 for different streams. In some example embodiments, the buffer memory 320 may be a cache memory for the processor 310.

The ECC block 330 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 340 may provide physical connections between the host and the storage device 100. The host interface 340 may provide an interface corresponding to a bus format of the host for communication between the host and the storage device 100. In some example embodiments, the bus format of the host may be a small computer system interface (SCSI) or a serial attached SCSI (SAS) interface. In other example embodiments, the bus format of the host may be a USB, a peripheral component interconnect (PCI) express (PCIe), an advanced technology attachment (ATA), a parallel ATA (PATA), a serial ATA (SATA), a nonvolatile memory (NVM) express (NVMe), etc., format.

The memory interface 350 may exchange data with the nonvolatile memory device 120. The memory interface 350 may transfer data to the nonvolatile memory device 120, or may receive data read from the nonvolatile memory device 120. In some example embodiments, the memory interface 350 may be connected to the at least one nonvolatile memory device 120 via one channel. In other example embodiments, the memory interface 350 may be connected to the at least one nonvolatile memory device 120 via two or more channels.

Figure 14:
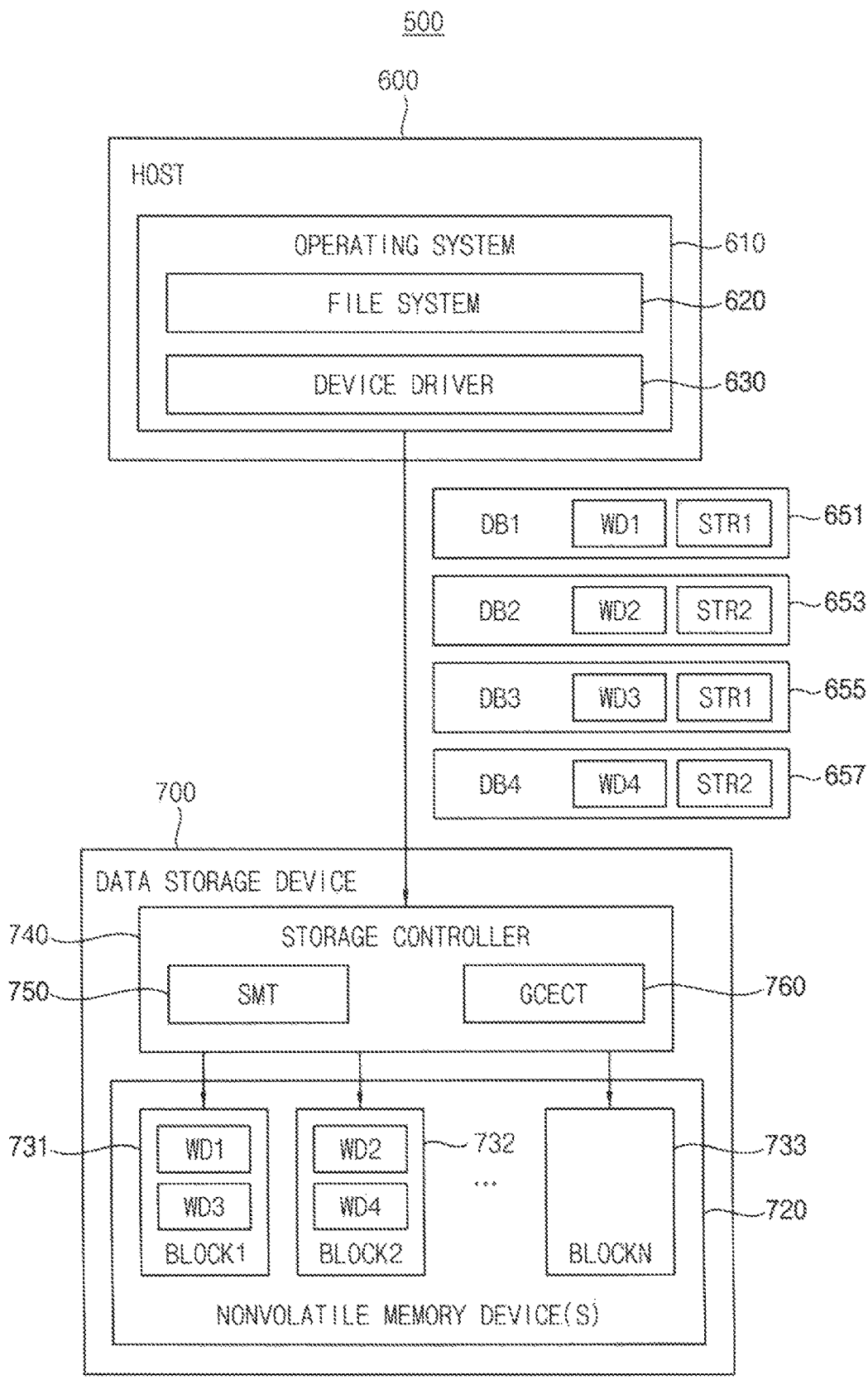
FIG. 14 is a block diagram illustrating a computing system that includes a storage device according to example embodiments.

FIG. 14 is a block diagram illustrating a computing system that includes a storage device according to example embodiments.

Referring to FIG. 14, a computing system 500 may include a host 600 and a storage device 700 that is attached or inserted to the host 600.

The host 600 may be driven by executing an operating system (OS) 610. The operating system 610 may include a file system 620 for file management and a device driver 630 for controlling peripheral devices including the storage device 700 at the operating system level.

The file system 620 may manage file names, extensions, file attributes, file sizes, cluster information, etc. of files accessed by requests from the host 600 or applications executed by the host 600. The file system 620 may generate, delete and manage data on a file basis. The device driver 630 may be a software module of a kernel for controlling the storage device 700. The host 600 or the applications executed by the host 600 may request a data write operation and a data read operation to the storage device 700 via the device driver 630. The host 600 may execute a plurality of applications provide various services. For example, the host 600 may execute a video application, a game application, a web browser application, etc.

The host 600 may generate a write command (e.g., the write command WCMD in FIG. 10) for requesting the data write operation and write data WD1, WD2, WD3 and WD4 to be stored into the storage device 700, and may provide the write data WD1, WD2, WD3 and WD4 with stream IDs STR1 and STR2. For example, the host 600 may request the data write operation for storing the write data WD1, WD2, WD3 and WD4 into the storage device 700, may generate a data block (DB1) 651 including the write data WD1 and the stream ID STR1, a data block (DB2) 653 including the write data WD2 and the stream ID STR2, a data block (DB3) 655 including the write data WD3 and the stream ID STR1, and a data block (DB4) 657 including the write data WD4 and the stream ID STR2.

The storage device 700 may include at least one nonvolatile memory device 720 that includes a plurality of memory blocks 731, 732 and 733, and a storage controller 740 that includes a stream mapping table 750 and a garbage collection expected cost table 760 for different streams. The nonvolatile memory device 720, the plurality of memory blocks 731, 732 and 733, the storage controller 740, the stream mapping table 750 and the garbage collection expected cost table 760 in FIG. 14 may be substantially the same as the nonvolatile memory device 120, the plurality of memory blocks 130, the storage controller 140, the stream mapping table 150 and the garbage collection expected cost table 160 in FIG. 10, respectively. The storage device 700 may operate based on the multi-stream scheme in which write data with the same stream ID (e.g., the write data WD1 and WD3 with the stream ID STR1) are written into the same memory block (e.g., the memory block 731). In the storage device 700, the garbage collection operation may be performed on memory blocks corresponding to the same stream ID, and thus the storage device 700 may have relatively improved and enhanced performance and durability.

Example embodiments may be applied to storage devices including nonvolatile memory devices. For example, the example embodiments may be applied to an SSD, a MMC, an eMMC or a UFS including flash memory devices.

According to one or more example embodiments, the units and/or devices described above, such as the components of the storage device 100 including the storage controller 140 and the non-volatile memory device 120 and the sub-components thereof including the control circuit 260, the processor 310 and the ECC block 330 may be implemented using hardware, a combination of hardware and software, or a non-transitory storage medium storing software that is executable to perform the functions of the same. These components may be embodied in the same hardware platform or in separate hardware platforms.

Hardware may be implemented using processing circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including tangible or non-transitory computer-readable storage media as discussed herein.

Storage media may also include one or more storage devices at units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media.

The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of example embodiments.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A storage device comprising:
a nonvolatile memory device including a plurality of memory blocks; and
a storage controller configured to,
control the nonvolatile memory device to operate based on a multi-stream scheme such that a plurality of data is written into the plurality of memory blocks based on which of a plurality of streams is associated with the plurality of data,
select at least two memory blocks among the plurality of memory blocks as victim memory blocks such that the victim memory blocks are configured to store data associated with a same stream of the plurality of streams, the storage controller configured to select the victim memory blocks associated with the same stream by,
calculating a first garbage collection expected cost for first data associated with a first stream stored in a plurality of first memory blocks based on a number of first valid pages spread among the plurality of first memory blocks,
calculating a second garbage collection expected cost for second data associated with a second stream stored in a plurality of second memory blocks based on a number of second valid pages spread among the plurality of second memory blocks, the second stream being different from the first stream, and
selecting one of the plurality of first memory blocks and the plurality of second memory blocks as the victim memory blocks based on the first garbage collection expected cost and the second garbage collection expected cost, and
perform a garbage collection operation on the victim memory blocks.

2. The storage device of claim 1, wherein the storage controller includes:
a stream mapping table configured to store a relationship between the plurality of memory blocks and a plurality of stream identifiers (IDs) representing the plurality of streams; and
a garbage collection expected cost table configured to store garbage collection expected costs for the plurality of streams.

3. The storage device of claim 2, wherein the storage controller is configured to generate the garbage collection expected cost table such that the garbage collection expected cost table includes:
candidate memory blocks sorted by a number of valid pages, the candidate memory blocks representing selectable memory blocks for the garbage collection operation from among the plurality of memory blocks;
an association indicating memory blocks corresponding to a same stream ID; and
the garbage collection expected costs for the plurality of stream IDs.

4. The storage device of claim 3, wherein the storage controller is configured to,
search the garbage collection expected cost table to determine whether there are stream IDs that satisfy a first condition, the first condition being satisfied by a sum of a number of invalid pages being greater than or equal to a reference value, and
select memory blocks corresponding to a first stream ID among the stream IDs having a lowest garbage collection expected cost that satisfy the first condition as the victim memory blocks.

5. The storage device of claim 1, wherein the storage device is one of a solid state drive (SSD), a multi media card (MMC), an embedded multi media card (eMMC) and a universal flash storage (UFS).

6. A computing system comprising:
a host configured to generate a write command and write data, the write command requesting a data write operation; and
a storage device configured to receive the write command and the write data from the host, the storage device including,
a nonvolatile memory device including a plurality of memory blocks configured to store the write data; and
a storage controller configured to,
operate based on a multi-stream scheme such that the write data is written into the plurality of memory blocks based on which of a plurality of streams is associated with the write data,
select at least two memory blocks among the plurality of memory blocks as victim memory blocks such that the victim memory blocks are configured to store data associated with a same stream of the plurality of streams, the storage controller configured to select the victim memory blocks associated with the same stream by,
calculating a first garbage collection expected cost for first data associated with a first stream stored in a plurality of first memory blocks based on a number of first valid pages spread among the plurality of first memory blocks,
calculating a second garbage collection expected cost for second data associated with a second stream stored in a plurality of second memory blocks based on a number of second valid pages spread among the plurality of second memory blocks, the second stream being different from the first stream, and
selecting one of the plurality of first memory blocks and the plurality of second memory blocks as the victim memory blocks based on the first garbage collection expected cost and the second garbage collection expected cost, and
perform a garbage collection operation on the victim memory blocks.

7. A method of operating a storage device to perform a garbage collection operation on a nonvolatile memory device having a plurality of memory blocks, the storage device configured to operate based on a multi-stream scheme such that a plurality of data is written into the plurality of memory blocks based on which of a plurality of streams is associated with the plurality of data, the method comprising:
selecting at least two memory blocks among the plurality of memory blocks as victim memory blocks such that the victim memory blocks are configured to store data associated with a same stream of the plurality of streams, the selecting the victim memory blocks associated with the same stream including,
calculating a first garbage collection expected cost for first data associated with a first stream stored in a plurality of first memory blocks based on a number of first valid pages spread among the plurality of first memory blocks,
calculating a second garbage collection expected cost for second data associated with a second stream stored in a plurality of second memory blocks based on a number of second valid pages spread among the plurality of second memory blocks, the second stream being different from the first stream, and
selecting one of the plurality of first memory blocks and the plurality of second memory blocks as the victim memory blocks based on the first garbage collection expected cost and the second garbage collection expected cost; and performing the garbage collection operation on the victim memory blocks.

8. The method of claim 7, wherein the selecting one of the first memory blocks and the second memory blocks comprises:
selecting the plurality of first memory blocks as the victim memory blocks in response to the first garbage collection expected cost being less than the second garbage collection expected cost,
selecting the plurality of second memory blocks as the victim memory blocks in response to the second garbage collection expected cost being less than the first garbage collection expected cost.

9. The method of claim 7, wherein the calculating the first garbage collection expected cost comprises:
calculating a sum of the number of first valid pages.

10. The method of claim 7, wherein the calculating the first garbage collection expected cost comprises:
dividing a sum of the number of first valid pages by a number of pages included in one memory block.

11. The method of claim 7, further comprising:
registering, in a stream mapping table, a relationship between the plurality of memory blocks and a plurality of stream identifiers (IDs) representing the plurality of streams, the registering including matching the plurality of stream IDs and respective ones of the plurality of memory blocks; and
managing a garbage collection expected cost table for different streams, the garbage collection expected cost table representing garbage collection expected costs for the plurality of streams, wherein
the selecting includes selecting the victim memory blocks based on the garbage collection expected cost table.

12. The method of claim 11, wherein the managing the garbage collection expected cost table includes:
sorting candidate memory blocks by a number of valid pages, the candidate memory blocks representing selectable memory blocks for the garbage collection operation from among the plurality of memory blocks;
associating memory blocks corresponding to a same stream ID with each other based on the stream mapping table; and
calculating the garbage collection expected costs for the plurality of stream IDs.

13. The method of claim 12, wherein the selecting comprises:
searching the garbage collection expected cost table to determine whether there are stream IDs that satisfy a first condition, the first condition being satisfied by a sum of a number of invalid pages being greater than or equal to a reference value; and
selecting memory blocks corresponding to one of the stream IDs that satisfy the first condition as the victim memory blocks.

14. The method of claim 13, wherein the selecting memory blocks selects the memory blocks corresponding to a first stream ID among the stream IDs having a lowest garbage collection expected cost that satisfy the first condition as the victim memory blocks.

15. The method of claim 11, further comprising:
updating the stream mapping table and the garbage collection expected cost table in response to at least one of the plurality of memory blocks being assigned for a data write operation or becoming a free memory block.

16. The method of claim 11, wherein the registering comprises:
registering, in the stream mapping table, a first memory block among the plurality of memory blocks and a first stream ID of first data to be stored into the first memory block, in response to the first memory block being assigned for a data write operation; and
deleting, from the stream mapping table, a second memory block among the plurality of memory blocks and a second stream ID corresponding to the second memory block, in response to the second memory block becoming a free memory block.

17. The method of claim 7, wherein performing the garbage collection operation on the victim memory blocks comprises:
copying first valid pages included in a first victim memory block among the victim memory blocks into a destination memory block;
copying second valid pages included in a second victim memory block among the victim memory blocks into the destination memory block; and
performing a data erase operation on the first victim memory block and the second victim memory block such that the first victim memory block and the second victim memory block are a free memory blocks.

* * * * *